(12) United States Patent
Reddy et al.

(10) Patent No.: US 7,537,054 B2
(45) Date of Patent: *May 26, 2009

(54) CEMENT COMPOSITIONS COMPRISING HIGH ASPECT RATIO MATERIALS AND METHODS OF USE IN SUBTERRANEAN FORMATIONS

(75) Inventors: B. Raghava Reddy, Duncan, OK (US); James F. Heathman, Katy, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 11/101,762

(22) Filed: Apr. 8, 2005

(65) Prior Publication Data

US 2006/0000612 A1   Jan. 5, 2006

Related U.S. Application Data

(63) Continuation-in-part of application No. 10/884,756, filed on Jul. 2, 2004, now Pat. No. 7,178,597.

(51) Int. Cl.
*E21B 33/13* (2006.01)
*C09K 8/487* (2006.01)
*C04B 14/38* (2006.01)

(52) U.S. Cl. .................. 166/292; 106/640; 106/711; 106/814; 106/816; 106/819

(58) Field of Classification Search ................. 166/292; 106/635, 711
See application file for complete search history.

(56) References Cited

U.S. PATENT DOCUMENTS

| | | |
|---|---|---|
| 2,463,561 A | 3/1949 | Riley |
| 2,738,285 A | 3/1956 | Biefeld et al. .................. 106/99 |
| 2,779,417 A | 1/1957 | Clark et al. |
| 2,805,719 A | 9/1957 | Anderson |
| 3,036,633 A | 5/1962 | Mayhew |
| 3,092,505 A | 6/1963 | Demaison |
| 3,146,828 A | 9/1964 | Mann |
| 3,220,863 A | 11/1965 | Mayhew |
| 3,363,689 A * | 1/1968 | Smith et al. .................. 166/292 |
| 3,736,162 A | 5/1973 | Chvalovsky et al. .......... 106/99 |
| 3,774,683 A | 11/1973 | Smith et al. .................. 166/293 |
| 3,834,916 A | 9/1974 | Kesler |
| 3,844,351 A * | 10/1974 | Sutton et al. ................. 166/293 |
| 3,852,082 A | 12/1974 | Majumdar et al. ........... 106/709 |
| 3,854,986 A | 12/1974 | Chvalovsky et al. ......... 428/391 |
| 3,861,926 A | 1/1975 | Irlam et al. .................... 501/38 |
| 3,861,927 A | 1/1975 | Kimura et al. ................ 501/38 |
| 3,904,424 A | 9/1975 | Aoki et al. .................... 501/38 |
| 3,953,953 A | 5/1976 | Marsden |
| 4,008,094 A | 2/1977 | Beall et al. ................ 252/62.59 |
| 4,030,939 A | 6/1977 | Mallow ....................... 106/624 |
| 4,036,654 A | 7/1977 | Yale et al. ..................... 501/38 |
| 4,062,913 A | 12/1977 | Miller |
| 4,066,465 A | 1/1978 | Mohri et al. .................... 501/38 |
| 4,090,884 A | 5/1978 | Goeman ....................... 106/711 |
| 4,140,533 A | 2/1979 | Ohtomo et al. |
| 4,142,906 A | 3/1979 | Iizawa .......................... 501/38 |
| 4,199,336 A | 4/1980 | Rittler |
| 4,224,377 A | 9/1980 | Moens |
| 4,240,840 A | 12/1980 | Downing et al. |
| 4,289,536 A | 9/1981 | Dereser ....................... 523/217 |
| 4,304,604 A | 12/1981 | Daerr et al. |
| 4,341,835 A | 7/1982 | MacDowell |
| 4,345,037 A | 8/1982 | Fyles et al. .................... 501/38 |
| 4,366,255 A | 12/1982 | Lankard |
| 4,474,907 A | 10/1984 | Genba et al. |
| 4,534,796 A | 8/1985 | Massol et al. ................ 106/711 |
| 4,565,840 A | 1/1986 | Kobayashi et al. |
| 4,585,487 A | 4/1986 | Destree et al. |
| 4,610,926 A | 9/1986 | Tezuke |
| 4,689,084 A | 8/1987 | Ambroise et al. ........... 106/711 |
| 4,780,141 A | 10/1988 | Double et al. |
| 4,793,861 A | 12/1988 | Sohm ............................. 524/5 |
| 4,818,288 A | 4/1989 | Aignesberger et al. |
| 4,835,122 A | 5/1989 | Chopinet ...................... 501/35 |
| 4,836,940 A | 6/1989 | Alexander ................... 507/119 |
| 4,858,487 A | 8/1989 | Mercier ..................... 74/424.7 |

(Continued)

FOREIGN PATENT DOCUMENTS

EP    1 284 248 A1    2/2003

(Continued)

OTHER PUBLICATIONS

Foreign communication from a related counterpart application dated Dec. 12, 2005.
Encyclopedia of Polymer Science and Engineering, vol. 6, pp. 802-839.
Patent application entitled "Methods of Cementing Using Cement Compositions Comprising Basalt Fibers" by Jiten Chatterji et al., filed, Mar. 25, 2005, as U.S. Appl. No. 11/089,609.
Saint-Gobain Vetrotex brochure entitled "Cem-FIL® Chopped strands 70/30", 2000.
Saint-Gobain Vetrotex brochure entitled "Cem-FIL® Chopped strands 60/38", 2000.
Saint-Gobain Vetrotex brochure entitled "Cem-FIL® Chopped strands 62/2", 2000.

(Continued)

*Primary Examiner*—George Suchfield
(74) *Attorney, Agent, or Firm*—Craig W. Roddy; Baker Botts, L.L.P.

(57) ABSTRACT

The present invention relates to subterranean well cementing operations, and more particularly, to cement compositions that include high aspect ratio materials, and methods for using such cement compositions in subterranean formations. An example of a method of the present invention is a method of cementing in a subterranean formation. An example of a composition of the present invention is a cement composition for use in a subterranean formation.

25 Claims, No Drawings

U.S. PATENT DOCUMENTS

| | | | |
|---|---|---|---|
| 4,871,395 A | 10/1989 | Sugama | 106/678 |
| 4,923,517 A | 5/1990 | Rerup et al. | 524/3 |
| 4,960,649 A | 10/1990 | Takata et al. | |
| 4,968,561 A | 11/1990 | Mizobe et al. | |
| 4,975,396 A | 12/1990 | Thiery | 501/99 |
| 5,064,785 A | 11/1991 | Kawamoto et al. | 501/72 |
| 5,118,225 A | 6/1992 | Koch et al. | |
| 5,154,955 A | 10/1992 | Delvaux et al. | 428/34.5 |
| 5,167,710 A | 12/1992 | Leroux et al. | 106/711 |
| 5,225,243 A | 7/1993 | Bruck et al. | |
| 5,298,071 A | 3/1994 | Vondran | 106/757 |
| 5,339,902 A | 8/1994 | Harris et al. | 166/293 |
| 5,358,676 A | 10/1994 | Jennings et al. | 264/71 |
| 5,421,409 A | 6/1995 | Mueller et al. | |
| 5,443,918 A | 8/1995 | Banthia et al. | |
| 5,447,564 A | 9/1995 | Xie et al. | |
| 5,456,752 A | 10/1995 | Hogan | |
| 5,489,626 A | 2/1996 | Takaki et al. | 523/103 |
| 5,588,489 A | 12/1996 | Chatterji et al. | |
| 5,628,822 A | 5/1997 | Hogan | |
| 5,641,815 A | 6/1997 | Fehlmann | 521/154 |
| 5,648,568 A | 7/1997 | Oharu et al. | 570/176 |
| 5,649,568 A | 7/1997 | Allen et al. | |
| 5,690,729 A | 11/1997 | Jones | 106/682 |
| 5,711,801 A | 1/1998 | Chatterji et al. | |
| 5,820,670 A | 10/1998 | Chatterji et al. | |
| 5,865,000 A | 2/1999 | Nemegeer et al. | |
| 5,875,845 A | 3/1999 | Chatterji et al. | |
| 5,897,699 A | 4/1999 | Chatterji et al. | |
| 5,900,053 A | 5/1999 | Brothers et al. | |
| 5,916,361 A | 6/1999 | Molloy et al. | 106/696 |
| 5,948,157 A | 9/1999 | McKenney et al. | |
| 5,981,630 A | 11/1999 | Banthia et al. | |
| 6,016,879 A | 1/2000 | Burts | 175/72 |
| 6,060,535 A | 5/2000 | Villar et al. | 166/293 |
| 6,063,738 A | 5/2000 | Chatterji et al. | |
| 6,080,234 A | 6/2000 | Clavaud et al. | 106/644 |
| 6,143,069 A | 11/2000 | Brothers et al. | |
| 6,152,227 A | 11/2000 | Lawson et al. | |
| 6,156,808 A | 12/2000 | Chatterji et al. | |
| 6,220,354 B1 | 4/2001 | Chatterji et al. | |
| 6,230,804 B1 | 5/2001 | Mueller et al. | |
| 6,297,202 B1 | 10/2001 | Chatterji et al. | |
| 6,308,777 B2 | 10/2001 | Chatterji et al. | |
| 6,332,921 B1 | 12/2001 | Brothers et al. | |
| 6,367,550 B1 | 4/2002 | Chatterji et al. | |
| 6,457,524 B1 | 10/2002 | Roddy | |
| 6,458,198 B1 | 10/2002 | Baret et al. | |
| 6,488,763 B2 | 12/2002 | Brothers et al. | |
| 6,500,252 B1 | 12/2002 | Chatterji et al. | |
| 6,508,305 B1 | 1/2003 | Brannon et al. | |
| 6,547,871 B2 | 4/2003 | Chatterji et al. | |
| 6,550,362 B1 | 4/2003 | Galinet et al. | |
| 6,582,511 B1 | 6/2003 | Velpari | |
| 6,613,424 B1 | 9/2003 | Putt et al. | 428/312.4 |
| 6,645,288 B1 | 11/2003 | Dargaud et al. | |
| 6,647,747 B1 | 11/2003 | Brik | |
| 6,689,208 B1 | 2/2004 | Brothers | |
| 6,702,044 B2 | 3/2004 | Reddy et al. | |
| 6,706,380 B2 | 3/2004 | Edwards et al. | 428/292.1 |
| 6,723,162 B1 | 4/2004 | Cheyrezy et al. | 106/644 |
| 6,729,405 B2 | 5/2004 | DiLullo et al. | |
| 6,823,940 B2 | 11/2004 | Reddy et al. | 166/295 |
| 6,824,847 B2 | 11/2004 | Mariaggi et al. | |
| 6,832,651 B2 | 12/2004 | Ravi et al. | 166/292 |
| 6,861,392 B2 | 3/2005 | Shaarpour | |
| 6,866,712 B1 | 3/2005 | Rossi et al. | |
| 6,907,929 B2 | 6/2005 | Leroy-Delage et al. | |
| 6,962,201 B2 | 11/2005 | Brothers | 166/293 |
| 7,174,961 B2 * | 2/2007 | Chatterji et al. | 166/292 |
| 7,178,597 B2 | 2/2007 | Reddy et al. | |
| 7,284,611 B2 | 10/2007 | Reddy et al. | |
| 2002/0069537 A1 | 6/2002 | Wenzler | 30/189 |
| 2002/0157575 A1 | 10/2002 | DiLullo et al. | |
| 2003/0010314 A1 | 1/2003 | Brosseau et al. | 123/306 |
| 2004/0040712 A1 | 3/2004 | Ravi et al. | |
| 2004/0045713 A1 | 3/2004 | Bianchi et al. | |
| 2004/0069537 A1 | 4/2004 | Reddy et al. | 175/72 |
| 2004/0069538 A1 | 4/2004 | Reddy et al. | |
| 2004/0106704 A1 | 6/2004 | Meyer et al. | |
| 2004/0108141 A1 | 6/2004 | Reddy et al. | |
| 2004/0194960 A1 | 10/2004 | DiLullo et al. | |
| 2004/0206501 A1 | 10/2004 | Brothers et al. | |
| 2004/0211562 A1 | 10/2004 | Brothers et al. | |
| 2006/0000611 A1 | 1/2006 | Reddy et al. | 166/293 |
| 2006/0000612 A1 | 1/2006 | Reddy et al. | |
| 2006/0051516 A1 | 3/2006 | Pietikainen et al. | |
| 2006/0096759 A1 | 5/2006 | Reddy et al. | |
| 2006/0157244 A1 | 7/2006 | Reddy et al. | |
| 2006/0174802 A1 | 8/2006 | Bedel et al. | |
| 2006/0213664 A1 | 9/2006 | Chatterji et al. | |
| 2008/0103065 A1 | 5/2008 | Reddy et al. | |

FOREIGN PATENT DOCUMENTS

| | | |
|---|---|---|
| GB | 2 392 682 A | 3/2004 |
| JP | 60016853 | 1/1985 |
| JP | 5339040 | 12/1993 |
| WO | WO 00/66878 | 9/2000 |
| WO | WO 02/18291 A1 | 3/2002 |
| WO | WO03/014040 A1 | 2/2003 |
| WO | WO 03/048526 | 6/2003 |
| WO | WO2004/022500 A2 | 3/2004 |
| WO | WO2004/022500 A3 | 3/2004 |
| WO | WO2004/101704 A1 | 11/2004 |
| WO | WO 2006/003389 | 1/2006 |
| WO | WO 2006/100506 | 9/2006 |
| WO | WO 2006/106301 | 10/2006 |
| WO | WO 2007054670 | 5/2007 |

OTHER PUBLICATIONS

Saint-Gobain Vetrotex brochure entitled "Cem-FIL® Chopped strands 60/2", 2000.

Saint-Gobain Vetrotex brochure entitled "Anti-Crak™ High Dispersion Chem-FIL AR-chopped strands", 2001.

Saint-Gobain Vetrotex brochure entitled "Anti-Crak™ High Performance Chem-FIL AR-chopped strands", 2001.

Saint-Gobain Vetrotex brochure entitled "Cme-Mesh™ Chem-FIL AR-systems 120/1", 2001.

Fibermesh brochure entitled "Novomesh™ e3™", 2001.

Fibermesh brochure entitled "VertiForce™ with e3™ technology".

Fibermesh brochure entitled "STEALTH® Virgin Polypropylene Fibers Plastic Shrinkage & Plastic Settlement Crack Control", 2001.

Fibermesh brochure entitled "Fibermesh® INFORCE™ Virgin Polypropylene Fibrillated Fibers Plastic Shrinkage & Plastic Settlement Crack Control Toughness", 2001.

Fibermesh brochure entitled "e3™ Concrete Reinforcement", 2001.

Paper entitled "The perspectives for the future of an innovative construction material" by Dr. Klaus Holschemacher.

Nycon brochure entitled "NYCON SF".

Nycon brochure entitled "NYCONB".

Nycon brochure entitled "AR Glass Fibers".

Nycon paper entitled "Steel and Synthetic Fiber Bands" by Bob Zellers.

SI Concrete Systems brochure entitled "Xorex® Steel Fiber", 2002.

SI Concrete Systems brochure entitled "Novotex® Steel Fiber", 2002.

Halliburton brochure entitled "CFR-3 Cement Friction Reducer", 1998.

Halliburton brochure entitled "D-AIR 3000 and D-AIR 3000L", 1999.

Halliburton brochure entitled "Econolite Additive for Cement Slurries", 1998.

Halliburton brochure entitled "FWCA Free-Water Cement Additive", 1999.
Halliburton brochure entitled "Microblock Cement Additive", 1999.
Halliburton brochure entitled "MicroBond Expanding Additive for Cement", 1999.
Halliburton brochure entitled "Pozmix® A Cement Additive", 1999.
Halliburton brochure entitled "Spherelite Cement Additive", 1999.
Halliburton brochure entitled "SSA-1 Strength-Stabilizing Agent", 1998.
Halliburton brochure entitled "ThermaLock™ Cement for Corrosive $CO_2$ Environments", 1999.
Paper entitled "Rock Fracture Mechanics Principles, Design and Applications" by B.N. Whitaker et al., pp. 349-371.
Paper entitled "Rock Mechanics in Wellbore construction" by Hazim Abass et al., Petroleum Well Construction, pp. 143-173.
Halliburton brochure entitled "Tuf Additive No. 2 Lost-Circulation Additive", 1999.
Foreign communication from a related counterpart application dated Sep. 7, 2006.
Office Action dated Feb. 2, 2007 from U.S. Appl. No. 11/595,147.
Office Action dated Jan. 24, 2007 from U.S. Appl. No. 11/272,951.
Novomesh™ e3™ Blend of Steel and Synthetic Fiber Plastic Shrinkage & Plastic Settlement Crack Control Hardened Concrete Benefits brochure.
Sudaglass Fiber Technology brochure entitled "Cut Fibers That Fill the Bill", Nov. 7, 2005.
Sudaglass Fiber Technology brochure entitled "Basalt-Based Fiber Technology", Nov. 7, 2005.
Office Action from U.S. Appl. No. 10/884,756, Feb. 17, 2006.
Foreign communication from a related application, Jun. 28, 2006.
Office Action from U.S. Appl. No. 11/595,147, Feb. 2, 2007.
Office Action from U.S. Appl. No. 11/272,951, Jan. 24, 2007.
Office Action from U.S. Appl. No. 11/272,951, Aug. 6, 2007.
Material Safety Data Sheet for AR continuous filaments glass fibers, Jun. 2007.
Cem-FIL® Fibers Product Details, Jun. 12, 2000.
Notice of Allowance from U.S. Appl. No. 10/884,756, Dec. 19, 2006.
Office Action from U.S. Appl. No. 11/595,147, Jul. 20, 2007.
Office Action from U.S. Appl. No. 11/595,147, Jan. 7, 2008.
Trabelsi et al., Fiber Content Affects Porosity, Permeability, and Strength of Cement, Oil and Gas Journal, 1999.
Foreign Search Report from a Related Counterpart Application, May 11, 2007.
e3 Inforce Virgin Polyproplyene Fibrillated Fibers Plastic Shrinkage & Plastic Settlement Crack Control Concrete Toughness brochure, 2001.
Office Action dated May 1, 2008 from U.S. Appl. No. 11/940,173.
Notice of Allowance dated Apr. 7, 2008 from U.S. Appl. No. 11/595,147.
Office Action for U.S. Appl. No. 11/940,173 mailed Sep. 22, 2008.
Notice of Allowance for U.S. Appl. No. 11/940,173 dated Dec. 9, 2008.

* cited by examiner

CEMENT COMPOSITIONS COMPRISING HIGH ASPECT RATIO MATERIALS AND METHODS OF USE IN SUBTERRANEAN FORMATIONS

CROSS-REFERENCE TO RELATED APPLICATION

This application is a continuation-in-part of U.S. application Ser. No. 10/884,756 filed on Jul. 2, 2004 now U.S. Pat. No. 7,178,597, which is incorporated herein by reference.

BACKGROUND

The present invention relates to subterranean well cementing operations, and more particularly, to cement compositions comprising high aspect ratio materials and methods for using such cement compositions in subterranean formations.

Hydraulic cement compositions commonly are utilized in subterranean operations, particularly subterranean well completion and remedial operations. For example, hydraulic cement compositions are used in primary cementing operations whereby pipe strings, such as casing and liners, are cemented in well bores. In performing primary cementing, a hydraulic cement composition is pumped into an annular space between the walls of a well bore and the exterior surface of the pipe string disposed therein. The cement composition sets in the annular space, thereby forming therein an annular sheath of hardened, substantially impermeable cement that supports and positions the pipe string in the well bore and bonds the exterior surface of the pipe string to the walls of the well bore. Hydraulic cement compositions also are used in remedial cementing operations, such as plugging highly permeable zones or fractures in well bores, plugging cracks and holes in pipe strings, and the like.

When the cement compositions contact permeable subterranean formations, fluid (e.g., water) may be lost into the formation. Excessive fluid loss may cause the cement composition to become prematurely dehydrated, thereby potentially causing bridging in the annulus and limiting the time for which said slurry can remain pumpable, and/or reducing bond strength between the set cement composition and a subterranean zone, the walls of pipe and/or the walls of the well bore. Fluid loss control additives (e.g., polymers and copolymers) may be included in a cement composition, inter alia, to reduce fluid loss into the formation. When the permeability of the formation is high, for example, because of unconsolidated or depleted formations, or microfractures, the fluid loss control additives (e.g., polymer and copolymers) may not be effective in preventing fluid loss from cement compositions. In these instances, lost circulation materials have also been included in cement compositions, inter alia, to reduce fluid loss into the formation. Examples of loss circulation materials that may be included in a cement composition include peanut shells, mica, cellophane, walnut shells, calcium carbonate, plant fibers, cottonseed hulls, ground rubber, and polymeric materials.

Another problem encountered in subterranean operations may be failure of the cement sheath. Once set, the cement sheath may be subjected to a variety of shear, tensile, impact, flexural, and compressive stresses that may lead to failure of the cement sheath, resulting in, inter alia, fractures, cracks, and/or debonding of the cement sheath from the pipe string and/or the formation. This can lead to undesirable consequences including, inter alia, lost production, environmental pollution, hazardous rig operations resulting from unexpected fluid flow from the formation caused by the loss of zonal isolation, and/or hazardous production operations. Cement failures may be particularly problematic in high temperature wells, where fluids injected into the wells or produced from the wells by way of the well bore may cause the temperature of any fluids trapped within the annulus to increase. Furthermore, high fluid pressures and/or temperatures inside the pipe string may cause additional problems during testing, perforation, fluid injection, and/or fluid production. If the pressure and/or temperature inside the pipe string increases, the pipe may expand and stress the surrounding cement sheath. This may cause the cement sheath to crack, or the bond between the outside surface of the pipe string and the cement sheath to fail, thereby breaking the hydraulic seal between the two. Furthermore, high temperature differentials created during production or injection of high temperature fluids through the well bore may cause fluids trapped in the cement sheath to thermally expand, causing high pressures within the sheath itself. Additionally, failure of the cement sheath also may be caused by, inter alia, forces exerted by shifts in subterranean formations surrounding the well bore, cement erosion, and repeated impacts from the drill bit and the drill pipe.

SUMMARY

The present invention relates to subterranean well cementing operations, and more particularly, to cement compositions comprising high aspect ratio materials and methods for using such cement compositions in subterranean formations.

An example of a method of the present invention is a method of cementing in a subterranean formation, comprising: providing a cement composition comprising water, cement, and melt-processed inorganic fibers having a mean aspect ratio of at least about 25; introducing the cement composition into a subterranean formation; and allowing the cement composition to set therein.

Another example of a method of the present invention is a method of controlling fluid loss in a subterranean cementing operation, comprising: providing a cementing composition that comprises cement and water; adding melt-processed inorganic fibers to the cement composition, the melt-processed inorganic fibers having a mean aspect ratio of at least about 25; introducing the cement composition into a well bore that penetrates a subterranean formation, wherein the melt-processed inorganic fibers at least partially prevent fluid loss from the cement composition into the subterranean formation; and allowing the cement composition to set therein.

An example of a composition of the present invention is a cement composition for use in a subterranean formation, comprising cement, water, and melt-processed inorganic fibers having a mean aspect ratio of at least about 25.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean well cementing operations, and more particularly, to cement compositions comprising high aspect ratio materials and methods for using such cement compositions in subterranean formations. As referred to herein, the term "aspect ratio" will be understood to mean the ratio of a solid body's length to its width.

Certain embodiments of the cement compositions of the present invention comprise cement, water, and a high aspect ratio material. Suitable high aspect ratio materials may comprise non-amorphous metallic fibers, alkali-resistant glass fibers, non-fibrous minerals, or a mixture thereof. Other suitable high aspect ratio materials may comprise melt-processed inorganic fibers. As used here, "melt-processed inorganic fibers" refers to fibers produced from inorganic materials using any suitable melt processing technique, such as melt blowing or melt spinning.

Any cement suitable for use in subterranean cementing operations may be used in accordance with the present invention. In one embodiment, the improved cement compositions of the present invention comprise a hydraulic cement. A variety of hydraulic cements are suitable for use, including those comprising calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof. In certain embodiments, the cement compositions of the present invention may comprise a Portland cement. In certain embodiments, the Portland cement may be chosen from those classified as Class A, C, G, and H cements according to *API Specification for Materials and Testing for Well Cements*, API Specification 10, Fifth Ed., Jul. 1, 1990. Another cement that may be useful in certain embodiments of the present invention is commercially available under the trade name "THERMALOCK™" from Halliburton Energy Services, Inc., of Duncan, Okla. Other cements that may be suitable for use in accordance with the present invention include, inter alia, low-density cements. Such low-density cements may be, inter alia, foamed cements or cements comprising another means to reduce their density, such as hollow microspheres, low-density elastic beads, fly ashes, blast furnace slag, or other density-reducing additives known in the art.

Generally, the water utilized in the cement compositions of the present invention may be fresh water, salt water (e.g., water containing one or more salts dissolved therein), brine (e.g., saturated salt water), or seawater. This water may be from any source, provided that the water does not contain an excess of compounds (e.g., dissolved organics) that may adversely affect other components in the cement composition. In some embodiments, the water may be present in the cement compositions of the present invention in an amount sufficient to form a pumpable slurry. In certain embodiments, the water is present in the cement compositions of the present invention in an amount in the range of from about 30% to about 180% by weight of cement ("bwoc") therein. In certain embodiments, the water is present in the cement compositions of the present invention in an amount in the range of from about 40% to about 50% bwoc therein. One of ordinary skill in the art, with the benefit of this disclosure, will recognize the appropriate amount of water for a chosen application.

In certain embodiments, the cement compositions of the present invention may comprise a high aspect ratio material that comprises non-amorphous (e.g., crystalline) metallic fibers, alkali-resistant glass fibers, non-fibrous minerals, or a mixture thereof. In some instances, these high aspect ratio materials may be included in the cement compositions of the present invention in addition to the melt-processed inorganic fibers that are described below. In certain embodiments, the non-amorphous metallic fibers may be obtained by cold drawing low-carbon steel wires (e.g., steel wool). Suitable metallic fibers include, but are not limited to, chopped steel fibers, stainless steel fibers, brass fibers, bronze fibers, nickel fibers, and titanium fibers. In certain embodiments of the present invention, the non-amorphous metallic fibers are low-carbon chopped steel wool fibers. Examples of suitable metallic fibers include, inter alia, those that are commercially available from Global Material Technologies, of Palatine, Ill., under the trade names "GMT-2136," "GMT-180," and "GMT-380." In certain embodiments wherein steel fibers are used, the steel fibers may comprise carbon present in an amount in the range of from about 0.06% to about 0.11% by weight. In certain embodiments of the present invention wherein the high aspect ratio material comprises non-amorphous metallic fibers, the non-amorphous metallic fibers generally have a mean diameter in the range of from about 0.025 millimeters to about 0.10 millimeters, and a mean length in the range of from about 0.1 millimeter to about 10 millimeters. As will be appreciated by one of ordinary skill in the art, with the benefit of this disclosure, the length and diameter of the non-amorphous metallic fibers may be adjusted to enhance properties such as their flexibility and ease of dispersion in the cement compositions of the present invention. In certain embodiments of the present invention wherein the high aspect ratio material comprises non-amorphous metallic fibers, the non-amorphous metallic fibers generally have an aspect ratio in the range of from about 1.25 to about 400. In certain embodiments, the non-amorphous metallic fibers may have an aspect ratio in the range of from about 15 to about 200, and in certain other embodiments, from about 25 to about 100. In certain embodiments of the present invention wherein the high aspect ratio material comprises non-amorphous metallic fibers, the metallic fibers may be present in the cement compositions of the present invention in an amount in the range of from about 0.5% to about 10% bwoc. Due to their density, certain metallic fibers may exhibit a propensity to settle out of the cement compositions of the present invention. Therefore, certain embodiments of the cement compositions of the present invention that comprise non-amorphous metallic fibers also may comprise a settling-prevention additive, such as a viscosifier, that may eliminate, or at least reduce, settling. Suitable settling-prevention additives include, inter alia, hydroxyethylcellulose, and xanthan gum. A suitable settling-prevention additive is commercially available from Halliburton Energy Services, Inc., under the trade name "FWCA." Where settling-prevention additives are included in the cement composition, they should be present in the cement composition in an amount that facilitates a uniform density throughout the cement composition.

In certain embodiments, the non-amorphous metallic fibers may be coated by, e.g., surfactants that may inhibit any reaction that may occur between the cement composition and the metallic fibers. Examples of suitable surfactants that may be used to coat the non-amorphous metallic fibers include, inter alia, hydrophobic organic materials such as sorbitol mono-oleate, sorbitol tri-oleate, and the like. Sorbitol mono-oleate is commercially available from Aldrich Chemical Company, of Milwaukee, Wis., under the trade name "SPAN 80," while sorbitol tri-oleate is commercially available from Aldrich Chemical Company under the trade name "SPAN 85." In certain embodiments of the present invention wherein the non-amorphous metallic fibers are coated, the coating may be present on the non-amorphous metallic fibers in an amount in the range of from about 0.5% to about 5% by weight of the fibers.

In certain embodiments, the high aspect ratio materials present in the cement compositions of the present invention may comprise glass fibers. In certain embodiments, the glass fibers are alkali-resistant (AR) glass fibers, although non-AR glass fibers also may be used in certain embodiments of the present invention. Examples of suitable non-AR glass fibers include general purpose E-glass fibers and specialty glass fibers, such as ECR glass fibers (high corrosion resistance), A-glass fibers, and C-glass fibers. These grades refer to ASTM Specification D 578-98. In certain embodiments of the present invention where non-AR glass fibers are used, the non-AR glass fibers may be made alkali-resistant through the application of a coating with an acrylic acid-based polymer, as will be understood by one of ordinary skill in the art, with the benefit of this disclosure. In certain embodiments wherein the cement compositions of the present invention comprise an alkaline cement, and the high aspect ratio materials comprise glass fibers, AR glass fibers may be particularly suitable. However, when prepared using larger portions of pozzolanic or latent-hydraulic cement additives (e.g., coal, fly ash, or silica dust), or high aluminate cements, certain embodiments of the cement compositions of the present invention may have lower pH values, which may facilitate the use of non-AR glass fibers. One of ordinary skill in the art, with the benefit of this disclosure, will recognize the amounts and mixtures of AR and non-AR resistant glass fibers to use depending on the alkalinity of the cement being used. In certain embodiments, the AR glass fibers may comprise zirconium oxide in an amount in the range of from about 0.01% to about 15% by weight; in certain other embodiments, the AR glass fibers may comprise zirconium oxide in an amount in the range of from about 10% to about 15% by weight. In certain embodiments of the present invention, the glass fibers have a length in the range of from 0.5 to about 13 millimeters, and a diameter in the range of from about 10 to about 400 microns. In certain embodiments, the glass fibers may have an aspect ratio in the range of from about 1.25 to about 5,000. In certain embodiments, the glass fibers may have an aspect ratio in the range of from about 10 to about 1,000, and in certain other embodiments, from about 20 to about 500. Examples of suitable glass fibers include, inter alia, "CEM-FIL® HD" chopped strands and "CEM-FIL® HP" chopped strands, available from Saint-Gobain Vetrotex America, Inc., of Valley Forge, Pa. Other examples of suitable glass fibers include, inter alia, "E" grade "FIBERGLAST," available from Fiberglast Development Corp., of Brookville, Ohio, and "NYCON AR" grade fibers from Nycon, Inc., of Westerly, R.I. When included in the cement compositions of the present invention, the glass fibers may be present in an amount in the range of from about 0.1% to about 20% bwoc.

In certain embodiments, the high aspect ratio materials present in the cement compositions of the present invention may comprise non-fibrous minerals. Generally, suitable non-fibrous minerals may have a layered, or a platy, structure. The aspect ratio of suitable non-fibrous minerals may be determined as a ratio of the length of the non-fibrous mineral to its width. Examples of suitable non-fibrous minerals include, but are not limited to, micas and vermiculites. In certain embodiments wherein mica is included in the cement compositions of the present invention, suitable micas include, but are not limited to, phlogopites (e.g., potassium magnesium aluminosilicates), biotites, lepidolites, and muscovites (e.g., potassium aluminum silicates). Mica materials employed in the present invention may have an aspect ratio in the range of from about 50 to about 250. Examples of commercially available mica materials include, but are not limited to, "MICA 5200," "MICA 5900, " and "MICA 6060," available from Polar Minerals, Inc., in Mt. Vernon, Ind.

In certain embodiments, the high aspect ratio materials may comprise melt-processed inorganic fibers. Among other things, inclusion of melt-processed inorganic fibers in the cement compositions of the present invention may aid in the prevention of lost circulation and/or enhance the compressive and tensile strengths of the set cement composition. Melt processing is a well known procedure for the production of fibers. Suitable melt processing techniques are described in Encyclopedia of Polymer Science and Engineering: Fiber Manufacture, J. E. Mcintyr and M. J. Denton (J. I. Kroschwitz ed., John Wiley and Sons 2d ed.). Suitable examples of melt-processed fibers include melt-blown fibers and melt-spun fibers. In some embodiments, combinations of melt-blown and melt-spun fibers may be used. The melt spinning of fibers may include spinning the material into a continuous strand of single or multiple filaments and then cutting it into a desired length.

Suitable melt-processed inorganic fibers may be produced from a variety of materials. Examples of suitable melt-processed inorganic fibers include basalt fibers, wollastonite fibers, non-amorphous metallic fibers, ceramic fibers, glass fibers (e.g., AR glass fibers and non-AR glass fibers, and combinations thereof. Suitable non-amorphous metallic fibers and glass fibers include those described above. The non-amorphous metallic fibers and the glass fibers may be included in the cement composition as the melt-processed inorganic fibers or as an additional component to the melt-processed inorganic fibers. Basalt fibers generally are produced from basalt, which is an igneous rock that is generally comprised of microscopic grains, such as calcium-sodium (plagioclase) feldspar, pyroxene, and olivine. Suitable melt-processed basalt fibers are commercially available from Sudaglass Fiber Technology, Houston, Tex. Suitable melt-processed ceramic fibers may be processed from alumina-silica material. An example of suitable commercially available melt-processed ceramic fibers is "FIBERFRAX" ceramic fiber, available from Unifrax Corporation, Niagra Falls, N.Y.

The melt-processed inorganic fibers suitable for use in the methods and compositions of the present invention generally have a mean length of less than about 10 millimeters. In certain embodiments, the melt-processed inorganic fibers may have a mean length in the range of from about 0.1 millimeters to about 10 millimeters. The melt-processed inorganic fibers suitable for use in the methods and compositions of the present invention generally have a mean aspect ratio of greater than about 25. In certain embodiments, the melt-processed inorganic fibers suitable for use in the methods and compositions of the present invention may have a mean aspect ratio of greater than about 100. In certain embodiments, the melt-processed inorganic fibers may have a mean aspect ratio in the range of from about 130 to about 660. In certain embodiments, the melt-processed inorganic fibers may have a mean aspect ratio in the range of from about 130 to about 330. In certain embodiments, the melt-processed inorganic fibers may have a mean aspect ratio in the range of from about 260 to about 660. As will be appreciated by one of ordinary skill in the art, with the benefit of this disclosure, the length and diameter of the melt-processed inorganic fibers may be adjusted to enhance properties such as their flexibility and ease of dispersion in the cement compositions of the present invention.

The melt-processed inorganic fibers should be present in the cement compositions of the present invention in an amount sufficient to provide the desired mechanical properties and/or fluid loss control. In some embodiments, the melt-processed inorganic fibers may be present in the cement compositions of the present invention in an amount in the range of from about 0.1% to about 20% bwoc. In some embodiments, the melt-processed inorganic fibers may be present in an amount in the range of from about 0.1% to about 10% bwoc. In some embodiments, the melt-processed inorganic fibers may be present in the cement compositions of the present invention in an amount in the range of from about 0.1% to about 3% bwoc.

Optionally, certain embodiments of the cement compositions of the present invention also may include solid materials that may strengthen and reinforce the cement. These solid materials may include both natural and man-made materials, and may have any shape, including, but not limited to, beaded, cubic, bar-shaped, flake, fiber, platelets, cylindrical, or mixtures thereof. Suitable such solid materials include, but are not limited to, carbon fibers, plastic fibers (e.g., polypropylene and polyacrylic nitrile fibers), and combinations thereof. Where included, these additional solid materials may be added to the cement composition of the present invention individually or in combination. Additionally, the solid materials of the present invention may be present in the cement composition in a variety of lengths and aspect ratios. One of ordinary skill in the art, with the benefit of this disclosure, will recognize the mixtures of type, length, and aspect ratio to use to achieve the desired properties of a cement composition for a particular application.

Optionally, additional additives may be added to the cement compositions of the present invention as deemed appropriate by one skilled in the art with the benefit of this disclosure. Examples of such additives include, inter alia, fly ash, silica compounds, fluid loss control additives, lost circulation materials, a surfactant, a dispersant, an accelerator, a retarder, a salt, a formation conditioning agent, fumed silica, bentonite, microspheres, expanding additives, weighting materials, organic fibers, and the like. For example, the cement compositions of the present invention may be foamed cement compositions comprising an expanding additive that produces gas within the cement composition in order, inter alia, to reduce the cement composition's density. An example of a suitable expanding additive comprises a blend containing gypsum, and is commercially available under the trade name "MICROBOND" from Halliburton Energy Services, Inc., at various locations. One of ordinary skill in the art with the benefit of this disclosure will recognize the proper amount of an expanding additive to use in order to provide a foamed cement composition having a desired density. An example of a suitable sodium silicate is commercially available from Halliburton Energy Services, Inc., under the trade name ECONOLITE®. An example of a suitable additive that demonstrates free-water-reduction and solids-suspension properties is commercially available from Halliburton Energy Services, Inc., of Duncan, Okla., under the trade name "FWCA™." An example of a suitable dispersant is commercially available from Halliburton Energy Services, Inc., under the trade name "CFR-3." An example of a suitable fly ash is an ASTM class F fly ash that is commercially available from Halliburton Energy Services, Inc., under the trade name "POZMIX® A." An example of a suitable silica flour is commercially available from Halliburton Energy Services, Inc., under the trade name "SSA-1." An example of a suitable fumed silica is an aqueous suspension of fumed silica that is commercially available from Halliburton Energy Services, Inc., under the trade name "MICROBLOCK." An example of a suitable foaming surfactant is commercially available from Halliburton Energy Services, Inc., under the trade name "ZONESEAL 3000." An example of a suitable defoamer is commercially available from Halliburton Energy Services, Inc., under the trade name "D-AIR 3000L."

An example of a method of the present invention is a method of cementing in a subterranean formation, comprising: providing a cement composition comprising water, cement, and non-amorphous metallic fibers having a mean aspect ratio in the range of from about 1.25 to about 400; introducing the cement composition into a subterranean formation; and allowing the cement composition to set therein.

Another example of a method of the present invention is a method of cementing in a subterranean formation, comprising: providing a cement composition comprising water, cement, and glass fibers having a mean aspect ratio in the range of from about 1.25 to about 5,000; introducing the cement composition into a subterranean formation; and allowing the cement composition to set therein.

Another example of a method of the present invention is a method of cementing in a subterranean formation, comprising: providing a cement composition comprising water, cement, and a non-fibrous mineral having a mean aspect ratio of at least about 50; introducing the cement composition into a subterranean formation; and allowing the cement composition to set therein.

An example of a method of the present invention is a method of cementing in a subterranean formation, comprising: providing a cement composition comprising water, cement, and melt-processed inorganic fibers having a mean aspect ratio of at least about 25; introducing the cement composition into a subterranean formation; and allowing the cement composition to set therein.

Another example of a method of the present invention is a method of controlling fluid loss in a subterranean cementing operation, comprising: providing a cementing composition that comprises cement and water; adding melt-processed inorganic fibers to the cement composition, the melt-processed inorganic fibers having a mean aspect ratio of at least about 25; introducing the cement composition into a well bore that penetrates a subterranean formation, wherein the melt-processed inorganic fibers at least partially prevent fluid loss from the cement composition into the subterranean formation; and allowing the cement composition to set therein. The melt-processed inorganic fibers may be added to the cement composition at any suitable time, such as before, after, or simultaneously with combining the water and the cement.

To facilitate a better understanding of the present invention, the following examples of certain aspects of some embodiments are given. In no way should the following examples be read to limit, or define, the scope of the invention.

EXAMPLE 1

Sample cement compositions were prepared by mixing a base cement slurry with various amounts and grades of chopped steel wool fibers. The base cement slurry comprised Class H cement, 39.42% bwoc water, and 0.25% bwoc FWCA™, and was prepared according to API Recommended Practice 10B, Twenty-Second Edition, December 1997. After the addition of the chopped steel wool fibers, the samples were stirred at 1,000-2,000 rpm for about 2 minutes, then cured at 190° F. for 72 hours at 3000 psi.

Sample Composition No. 1 comprised the base cement slurry, with no fibers.

Sample Composition No. 2 comprised the base cement slurry mixed with 1% GMT-2136 Grade 0 chopped steel wool fibers bwoc.

Sample Composition No. 3 comprised the base cement slurry mixed with 5% GMT-2136 Grade 0 chopped steel wool fibers bwoc.

Sample Composition No. 4 comprised the base cement slurry mixed with 1% GMT-180 Grade 1 chopped steel wool fibers bwoc.

Sample Composition No. 5 comprised the base cement slurry mixed with 3% GMT-180 Grade 1 chopped steel wool fibers bwoc.

Sample Composition No. 6 comprised the base cement slurry mixed with 5% GMT-180 Grade 1 chopped steel wool fibers bwoc.

The compressive and tensile strengths exhibited by the sample cement compositions are summarized in Table 1, below. The Brazilian Tensile Strength Test was performed according to ASTM C496, and used dog-bone-shaped briquettes according to the procedure described for test CRD-C 260-01 in the U.S. Army Corps of Engineers' Handbook for Concrete and Cement.

TABLE 1

| Sample Composition | Design Density (lb/gal) | Density of top set cement (lb/gal) | Density of middle set cement (lb/gal) | Density of bottom set cement (lb/gal) | Compressive Strength (psi) | Brazilian Tensile Strength (psi) |
|---|---|---|---|---|---|---|
| Sample Composition No. 1 | 16.4 | 16.4 | 16.4 | 16.4 | 4340 | 430 |
| Sample Composition No. 2 | 16.48 | 16.65 | 16.7 | 16.75 | 3400 | 500 |
| Sample Composition No. 3 | 16.82 | 16.96 | 17.06 | 17.09 | 3800 | 540 |
| Sample Composition No. 4 | 16.48 | 16.64 | 16.72 | 16.74 | 3320 | 400 |
| Sample Composition No. 5 | 16.65 | 16.87 | 16.93 | 16.96 | 3250 | 490 |
| Sample Composition No. 6 | 16.82 | 16.96 | 17.06 | 17.1 | 3820 | 460 |

Example 1 demonstrates, inter alia, that the cement compositions of the present invention comprising fibers having high aspect ratios are suitable for use in subterranean formations.

EXAMPLE 2

A base cement slurry was prepared according to API Recommended Practice 10B, Twenty-Second Edition, December 1997, that comprised Class H cement and 37.34% water-bwoc, and that had a density of 16.74 lb/gal. Samples were cured at 190° F. and 3000 psi for 72 hours.

Sample Composition No. 7 comprised the base cement slurry, with no glass fibers.

Sample Composition No. 8 comprised the base cement slurry mixed with 0.75% CEM-FIL® HD AR bwoc using API mixing procedures.

Sample Composition No. 9 comprised the base cement slurry mixed by hand with 0.75% CEM-FIL® HD bwoc.

Sample Composition No. 10 comprised the base cement slurry mixed by hand with 1.5% CEM-FIL® HD bwoc.

Sample Composition No. 11 comprised the base cement slurry mixed with 0.75% FiberGlast 29 bwoc using API mixing procedures.

Sample Composition No. 12 comprised the base cement slurry mixed with 1.5% FiberGlast 29 bwoc using API mixing procedures.

Sample Composition No. 13 comprised the base cement slurry mixed with 0.75% FiberGlast 38 bwoc using API mixing procedures.

The compressive and tensile strengths exhibited by the sample compositions are summarized in Table 2, below.

TABLE 2

| Sample Composition | Compressive Strength (psi) | Tensile Strength (psi) |
|---|---|---|
| Sample Composition No. 7 | 5380 | 522 |
| Sample Composition No. 8 | 4746 | 470 |
| Sample Composition No. 9 | 4642 | 560 |
| Sample Composition No. 10 | 6060 | 650 |
| Sample Composition No. 11 | 6042 | 712 |
| Sample Composition No. 12 | 6445 | 642 |
| Sample Composition No. 13 | 6190 | 660 |

Example 2 demonstrates, inter alia, that the sample compositions comprising glass fibers exhibited compressive and tensile strengths comparable to, or significantly better than those exhibited by the base cement slurry. Furthermore, both AR and non-AR glass fibers had beneficial effects on the strength of the sample cement compositions.

EXAMPLE 3

Sample cement compositions were prepared according to the following procedure: Class G cement and silica flour (SSA-1) were added to a mixture of seawater and calcium chloride solution according to API Recommended Practice 10B, Twenty-Second Edition, December 1997. The composition then was transferred to a foam blender, and the foaming surfactant ZONESEAL 3000 was added, in varying amounts. The composition was stirred at high speed for 15-30 seconds, while foaming was completed. For certain compositions comprising glass fibers, the glass fibers were hand mixed into the composition with a spatula. Tensile strengths of the cured cement compositions were measured according to CRD-C 260-01.

Sample Composition No. 14 comprised Class G cement, 49.45% seawater bwoc, 35% SSA-1 bwoc, 2.5% ZONESEAL 3000 by weight of the water, 0.49 gal/sack 33% $CaCl_2$ solution, and no glass fibers.

Sample Composition No. 15 comprised Class G cement, 49.45% seawater bwoc, 35% bwoc SSA-1, 2.5% ZONESEAL 3000 by weight of the water, 0.49 gallons/sack 33% $CaCl_2$ solution, and 14.35% CEM-FIL® HP glass fibers by volume of the foamed slurry.

Sample Composition No. 16 comprised Class G cement, 49.45% seawater bwoc, 35% bwoc SSA-1, 2.5% ZONESEAL 3000 by weight of the water, 0.49 gallons/sack 33% $CaCl_2$ solution, and 28.67% CEM-FIL® HP glass fibers by volume of the foamed slurry.

Sample Composition No. 17 comprised Class G cement, 49.45% seawater bwoc, 35% SSA-1 bwoc, 1.5% ZONESEAL 3000 by weight of the water, 0.65 gallons/sack 33% $CaCl_2$ solution, and 14.35% CEM-FIL® HP glass fibers by volume of the foamed slurry.

Sample Composition No. 18 comprised Class G cement, 129.66% seawater bwoc, 22.5% SSA-1 bwoc, 2.02 gallons/sack MICROBLOCK, 0.23 gallons/sack ECONOLITE®, and no glass fibers.

Sample Composition No. 19 comprised Class G cement, 129.66% seawater bwoc, 22.5% SSA-1 bwoc, 2.02 gallons/sack MICROBLOCK, 0.23 gallons/sack ECONOLITE, and 30% CEM-FIL® HP glass fibers by volume of the cement slurry.

Sample Composition No. 20 comprised Class G cement, 129.66% seawater bwoc, 22.5% SSA-1 bwoc, 2.02 gallons/sack MICROBLOCK, 0.46 gallons/sack ECONOLITE, and 30% CEM-FIL® HP glass fibers by volume of the cement slurry.

The sample compositions were cured under a variety of curing conditions, set forth below.

Curing Condition A consisted of curing at room temperature for 2-3 days, followed by curing at 60° C. in a water bath for 3 days.

Curing Condition B consisted of curing at room temperature for 2-3 days, followed by curing at 160° C. and 3000 psi for 3 days.

Curing Condition C consisted of curing at room temperature for 2-3 days, followed by curing at 130° C. and 3000 psi for 3 days.

Curing Condition D consisted of curing at room temperature for 2-3 days, followed by curing at 120° C. and 3000 psi for 3 days.

Curing Condition E consisted of curing at room temperature for 2-3 days, followed by curing at 110° C. and 3000 psi for 3 days.

The tensile strengths exhibited by the sample compositions after curing under the various curing conditions are summarized in Table 3, below.

TABLE 3

| Sample Composition | Curing Conditions | Unfoamed Slurry Density (lb/gal) | Foamed Slurry Density (lb/gal) | Tensile Strength (psi) |
|---|---|---|---|---|
| Sample Composition No. 14 | A | 16.3 | 13.0 | 160 |
| Sample Composition No. 14 | B | 16.3 | 13.0 | 427 |
| Sample Composition No. 15 | A | 16.3 | 13.0 | 364 |
| Sample Composition No. 15 | B | 16.3 | 13.0 | 326 |
| Sample Composition No. 16 | A | 16.3 | 13.8 | 306 |
| Sample Composition No. 16 | C | 16.3 | 13.8 | 398 |
| Sample Composition No. 17 | A | 14.8 | 12.5 | 220 |
| Sample Composition No. 17 | B | 14.8 | 12.5 | 219 |
| Sample Composition No. 18 | A | 12.5 | N.A. | 112 |
| Sample Composition No. 18 | B | 12.5 | N.A. | 81 |
| Sample Composition No. 19 | A | 12.5 | N.A. | 191 |
| Sample Composition No. 19 | C | 12.5 | N.A. | 169 |
| Sample Composition No. 20 | C | 12.5 | N.A. | 138 |
| Sample Composition No. 20 | D | 12.5 | N.A. | 220 |
| Sample Composition No. 20 | E | 12.5 | N.A. | 245 |

As shown in Table 3, the inclusion of AR glass fibers improved the tensile strengths of both foamed and unfoamed cement compositions.

EXAMPLE 4

Impact strength tests were performed on sample cement compositions that comprised Class H cement, 39.4% water bwoc, and 0.25% FWCA™ bwoc. Fibers were added to certain cement compositions, between 500-2000 rpm, after the cement compositions had been prepared according to API Recommended Practice 10B, Twenty-Second Edition, December 1997. For certain compositions, the fibers were coated with a surfactant (sorbitol mono-oleate mixed with isopropyl alcohol ("IPA") in a 1:1 weight ratio). The IPA-sorbitol mono-oleate mixture then was applied to certain of the fibers in an amount sufficient to coat the fibers with a net weight of 0.5%, 1.5%, or 3.0% of sorbitol mono-oleate. The coated fibers were agitated by tumbling overnight, and the IPA was allowed to evaporate in a lab hood. The sample cement compositions were cured either in a water bath at 190° for 72 hours ("Method A") or in an autoclave at 190° F. for 72 hours under 3000 psi ("Method B"). Compressive strengths were measured according to API Recommended Practice 10B. Tensile strengths were measured according to CRD-C 260-01.

Impact strength tests were performed with a Gardner Impact Tester, Model #5510, manufactured by Paul N. Gardner Co. Inc., of Lauderdale-by-the-sea, Florida. The dropping weight comprised a 2 pound metal cylinder having a ball diameter of 0.5%. A procedure was developed that provided for differentiation of sample compositions having different impact strengths. First, the sample cement compositions were poured with 2"×2"×2" brass molds, and cured by either Method A or Method B above. Once removed from the mold, the cured sample cement compositions were submerged in water until testing.

The smooth side of the cured sample cement composition was placed on the dye plate of the impact tester. While the cured cement composition was held in place, the dropping weight was raised to a height of about 15 inches in the guide tube, then allowed to fall freely. If the cured sample cement composition did not split into separate pieces, the dropping weight was raised again and allowed to drop on the scope impact spot as before. If the cured sample cement composition remained unbroken after 9 impacts, the height from which the dropping weight was to be dropped was increased to 20 inches. The process was repeated, and if the cured sample cement composition survived 9 impacts from 20 inches, the drop height then was increased to 30 inches, and the process agent was repeated.

The results of the testing are set forth in the table below.

TABLE 4

| Sample Composition | Steel Wool Fibers | Fiber Concentration | Surfactant Concentration | Slurry Density | Curing Method | Impacts From 15" | Impacts From 20" | Impacts From 30" | Compressive Strength (psi) | Tensile Strength (psi) |
|---|---|---|---|---|---|---|---|---|---|---|
| Sample Composition No. 21 | None | None | None | 16.4 | B | 1 | 0 | 0 | 4340 | 430 |
| Sample Composition No. 22 | GMT-2136 | 3% bwoc | None | 16.65 | A | 5.5 | 0 | 0 | 3050 | 400 |
| Sample Composition No. 23 | GMT-180 | 3% bwoc | None | 16.65 | A | 5 | 0 | 0 | 3190 | 370 |
| Sample Composition No. 24 | GMT-380 | 3% bwoc | None | 16.65 | A | 5 | 0 | 0 | 3010 | 410 |
| Sample Composition No. 25 | GMT-180 | 3% bwoc | None | 16.65 | B | 9 | 5 | 0 | 3670 | N.D. |
| Sample Composition No. 26 | GMT-180 | 3% bwoc | 0.5% by weight of fiber | 16.65 | B | 9 | 9 | 1 | 4020 | N.D. |
| Sample Composition No. 27 | GMT-180 | 3% bwoc | 1.5% by weight of fiber | 16.65 | B | 9 | 9 | 3 | 3880 | N.D. |
| Sample Composition No. 28 | GMT-180 | 3% bwoc | 3% by weight of fiber | 16.65 | B | One drop from a height of 40 inches | | | 3430 | N.D. |

In Table 4, "N.D." indicates that the tensile strength of a particular sample composition was not determined.

Example 4 demonstrates, inter alia, that cement compositions of the present invention comprising steel wool fibers possess desirable impact strengths, and that the application of a coating to the steel wool fibers may further increase the impact strength of a cement composition.

EXAMPLE 5

A variety of sample cement compositions were prepared as follows.

Sample Composition No. 29 was prepared according to API Recommended Practice 10B, Twenty-Second Edition, December 1997, by mixing 56% Class H cement bwoc, 22% POZMIX® A bwoc, 22% fumed silica bwoc, and 2% bwoc bentonite. This mixture then was added to 112.6% bwoc water and 0.125 gallons of D-AIR 300L per sack of Class H cement.

Sample Composition No. 30 was prepared similarly to Sample Composition No. 29, except that 1% carbon fibers were added to the solid mixture of cement, POZMIX® A, fumed silica, and bentonite. The carbon fibers were supplied by Halliburton Energy Services, Inc., under the trade name "FDP C684-03." After the addition of the carbon fibers to the solid mixture, and after the addition of water and D-AIR 3000L, 1% CEM-FIL HD AR grade glass fibers bwoc were hand mixed into the composition.

Sample Composition No. 31 was prepared similarly to Sample Composition No. 30, except that the CEM-FIL HD AR grade glass fibers were added in the cement of 2% bwoc.

Sample Composition No. 32 was prepared similarly to Sample Composition No. 31, except that the CEM-FIL HD AR grade glass fibers were added in the cement of 4% bwoc.

The compressive strength and tensile strengths of the cement compositions were measured according to the procedures described earlier, and are set forth in the table below.

TABLE 5

| Sample Composition | Compressive Strength (psi) | Tensile Strength (psi) |
|---|---|---|
| Sample Composition No. 29 | 1210 | 90 |
| Sample Composition No. 30 | 1470 | 260 |
| Sample Composition No. 31 | 1570 | 170 |
| Sample Composition No. 32 | 1300 | 175 |

Example 5 demonstrates, inter alia, that the cement compositions of the present invention comprising a mixture of carbon fibers and glass fibers possess desirable compression strengths and tensile strengths.

EXAMPLE 6

Sample cement compositions were prepared comprising Class H cement, 15% fumed silica bwoc, 25% POZMIX® A bwoc, 1% CFR-3 bwoc, and 0.05 gallons D-AIR 3 per sack of Class H cement. The sample cement compositions further comprised glass spheres commercially available from 3M Corporation of St. Paul, Minn., under the trade name SCOTCHLITE K46, in differing amounts. Mica was added to some of the sample compositions. The sample composition further comprised different amounts of water.

The curing conditions of each sample composition, along with certain mechanical properties, are set forth in the table below. Where performed, the compressive strength and tensile strength of the cement compositions were carried out according to the testing procedures previously described.

TABLE 6

| Sample Composition | Mica Name | Particle Size, microns | Aspect Ratio | % Mica bwoc | Beads % bwoc | Water % bwoc | Density ppg | Curing Conditions | Tensile Strength, psi | Comp. Str. psi |
|---|---|---|---|---|---|---|---|---|---|---|
| Sample Composition No. 33 | None | N.A. | N.A. | N.A. | 22 | 55.6 | 12 | 100° F., 72 hrs, 3000 psi | 130 | N.D. |
| Sample Composition No. 34 | 5900 | 70 | 50 | 10 | 25 | 53 | 12 | 100° F., 72 hrs, 3000 psi | 251 | N.D. |
| Sample Composition No. 35 | None | N.A. | N.A. | N.A. | 25 | 57.7 | 11.6 | 195° F., 72 hrs, 3000 psi | 457 | 5480 |
| Sample Composition No. 36 | 6060 | 250 | 60 | 3 | 25.7 | 57.7 | 11.6 | 195° F., 72 hrs, 3000 psi | 540 | 5040 |
| Sample Composition No. 37 | None | N.A. | N.A. | N.A. | 25 | 57.7 | 11.6 | 150° F., 48 hrs, atm. pressure | 224 | 5258 |
| Sample Composition No. 38 | 6060 | 250 | 60 | 3 | 25.7 | 57.7 | 11.6 | 150° F., 48 hrs, atm. pressure | 293 | 4713 |

In Table 6, "N.D." indicates that the tensile strength of a particular sample composition was not determined, and "N.A." indicates that a particular measurement was not applicable.

The above Example demonstrates, inter alia, that the cement compositions of the present invention comprising mica may be suitable for use in subterranean formations.

EXAMPLE 7

Sample compositions were prepared in accordance with API Recommended Practice 10B, Twenty-Second Edition, December 1997. The amount and type of melt-processed inorganic fibers included in each sample composition were varied. Once prepared, the compressive strengths were measured as described in the API Recommended Practice by curing the slurry in 2"×2"×2" brass molds at 190° F. for 72 hrs under a pressure of 3,000 psi. The tensile strengths were measured by curing the slurry under identical conditions described above in dog bone briquette molds which had the dimensions described for test CRD-C 260-01 in the U.S. Army Corps of Engineers' Handbook for Concrete and Cement. The compressive and tensile strengths were measured on a strength Testing instrument manufactured by Tinius-Olsen Inc., Horsham, Pa.

Sample Composition No. 39 comprised Class H cement and water (37.34% bwoc) prepared according to the API procedure and had a density of 16.4 pounds per gallon.

Sample Composition No. 40 comprised a cement slurry of 16.67 pounds per gallon density prepared in accordance with the API procedure by adding a dry blend of Class H cement and melt-processed basalt fibers (0.75% bwoc) to mix water (37.34% bwoc). The melt-processed basalt fibers were strand cut to a length of 3 millimeters are were obtained from Sudaglass Fiber Technology, Houston, Tex.

Sample Composition No. 41 was identical to Sample Composition No. 40 except that the amount of melt-processed basalt fibers was increased to 1.5% bwoc and, as a result, the slurry density was 16.69 pounds per gallon.

Sample Composition 42 was identical to Sample Composition 41 except that the dry cement blend was added to mix water at a blender speed of 2000 rpm and stirred for 50 sec.

Sample Composition 43 was similar to Sample Composition 40 except that the melt-processed basalt fibers were 6 millimeters in length.

Sample Composition 44 was similar to Sample Composition 41 except that the melt-processed basalt fibers were 6 mm in length.

TABLE 7

| Sample Composition | Fiber Length (mm) | Aspect Ratio | % Fiber (bwoc) | Compressive Strength (psi) | Tensile Strength (psi) |
|---|---|---|---|---|---|
| Sample Composition No. 39 | None | None | None | 5380 | 520 |
| Sample Composition No. 40 | 3 | 130-330 | 0.75 | 4480 | 540 |
| Sample Composition No. 41 | 3 | 130-330 | 1.5 | 6370 | 550 |
| Sample Composition No. 42 | 3 | 130-330 | 1.5 (low shear) | 4570 | 510 |
| Sample Composition No. 43 | 6 | 260-660 | 0.75 | 4970 | 570 |
| Sample Composition No. 44 | 6 | 260-660 | 1.5 | 5020 | 610 |

Example 7 demonstrates, inter alia, that the sample compositions comprising melt-processed basalt fibers exhibited compressive and tensile strengths comparable to, or better than those exhibited by the base cement slurry. The tensile strength values were higher for 6 millimeter basalt fibers relative to the 3 millimeter basalt fibers.

EXAMPLE 8

The effectiveness of the fibers to reduce loss of fluids from cement slurries was simulated by using a base fluid that comprised 1.64 weight % bentonite clay suspensions in water. A specified amount of either glass fibers of 3 mm length available from Saint Gobain Vetrotex, Madrid, Spain or basalt fibers of 6 mm length available from Sudaglass fiber technology were mixed into the base fluid and charged into a cement fluid loss cell used for measurement of cement slurry fluid losses as described in API Recommended Practice 10B, Twenty Second Edition, December 1997 and volume of fluid loss volume was measured as a function of time. The values were calculated for 30 minute fluid losses according to the equations provided in the API manual. Two levels of fibers were tested to measure the effect of fiber concentration on fluid loss ability. A comparative test was performed without any fibers. The results are listed in Table 2.

Sample Composition No. 45 comprised 600 cc of water and 10 grams of bentonite clay.

Sample Composition No. 46 comprised the base fluid and AR glass fibers in an amount of about 1.98 pounds per barrel. The AR glass fibers were strand cut to a length of about 3 millimeters with a diameter of 20 microns (aspect ratio, 150).

Sample Composition No. 47 comprised the base fluid and AR glass fibers in an amount of about 4.95 pounds per barrel. The AR glass fibers were strand cut to a length of about 3 millimeters with a diameter of 20 microns (aspect ratio, 150). The glass fibers and the bentonite formed lumps of a gelatinous mass.

Sample Composition No. 48 comprised the base fluid and basalt fibers in an amount of about 1.98 pounds per barrel. The basalt fibers were strand cut to a length of about 6 millimeters and had a mean aspect ratio in the range of from about 230 to about 660.

Sample Composition No. 49 comprised the base fluid and basalt fibers in an amount of about 4.95 pounds per barrel. The basalt fibers were strand cut to a length of about 6 millimeters and had a mean aspect ratio in the range of from about 230 to about 660. The basalt fibers and the bentonite formed lumps of a gelatinous mass.

The results of the fluid loss tests are summarized in Table 8, below.

TABLE 8

| Sample Composition | Fiber Type | Fiber Length (mm) | Fiber Amount (lb/bbl) | Initial Spurt (ml) | Total Fluid Collected (ml) | Time (min) | Fluid Loss Calculated (cc/min) |
|---|---|---|---|---|---|---|---|
| Sample Composition No. 45 | None | None | None | 33 | 179 | 17 | 476 |
| Sample Composition No. 46 | AR Glass | 3 | 1.98 | 33 | 58 | 30 | 116 |
| Sample Composition No. 47 | AR Glass | 3 | 4.95 | 60 | 105 | 30 | 206 |
| Sample Composition No. 48 | Basalt | 6 | 1.98 | 44 | 112 | 30 | 224 |
| Sample Composition No. 49 | Basalt | 6 | 4.95 | 120 | 135 | 4.1 | 731 |

Example 8 demonstrates, inter alia, that the sample compositions comprising basalt fibers or AR glass fibers had fluid loss comparable to, or significantly less than the base fluid.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee

What is claimed is:

1. A method of cementing in a subterranean formation, comprising:
   providing a cement composition comprising water in an amount in the range of from about 30% to about 180% by weight of the cement, cement, and melt-processed inorganic fibers having a mean aspect ratio of at least about 25, wherein the melt-processed inorganic fibers comprise at least one type of fiber selected from the group consisting of wollastonite fibers and ceramic fibers;
   introducing the cement composition into a subterranean formation; and
   allowing the cement composition to set therein.

2. The method of claim 1 wherein the melt-processed inorganic fibers further comprise basalt fibers.

3. The method of claim 1 wherein the melt-processed inorganic fibers comprise at least one of the following: melt-spun fibers or melt-blown fibers.

4. The method of claim 1 wherein the melt-processed inorganic fibers have a mean aspect ratio of at least about 100.

5. The method of claim 1 wherein the melt-processed inorganic fibers have a mean aspect ratio in the range of from about 130 to about 660.

6. The method of claim 1 wherein the melt-processed inorganic fibers have a mean length of less than about 10 millimeters.

7. The method of claim 1 wherein the cement composition further comprises non-amorphous metallic fibers having a mean aspect ratio of from about 1.25 to about 400.

8. The method of claim 1 wherein the cement composition further comprises second melt-processed inorganic fibers comprising glass fibers having a mean aspect ratio in the range of from about 1.25 to about 5,000.

9. The method of claim 1 wherein the cement composition further comprises a non-fibrous mineral having a mean aspect ratio of at least about 50.

10. The method of claim 1 wherein the melt-processed inorganic fibers have a length in the range of from 0.5 to 6 millimeters.

11. A method of controlling fluid loss in a subterranean cementing operation, comprising:
   providing a cementing composition that comprises cement and water in an amount in the range of from about 30% to about 180% by weight of the cement;
   adding melt-processed inorganic fibers to the cementing composition, the melt-processed inorganic fibers having a mean aspect ratio of at least about 25, and wherein the melt-processed inorganic fibers comprise at least one type of fiber selected from the group consisting of wollastonite fibers and ceramic fibers;
   introducing the cementing composition into a well bore that penetrates a subterranean formation, wherein the melt-processed inorganic fibers at least partially prevent fluid loss from the cementing composition into the subterranean formation; and
   allowing the cementing composition to set therein.

12. The method of claim 11 wherein the melt-processed inorganic fibers have a mean aspect ratio of at least about 100.

13. The method of claim 11 wherein the melt-processed inorganic fibers have a mean length of less than about 10 millimeters.

14. The method of claim 11 wherein adding the melt-processed inorganic fibers to the cementing composition occurs before, after, or simultaneously with combining the water and the cement.

15. The method of claim 11 wherein the melt-processed inorganic fibers further comprise basalt fibers.

16. The method of claim 11 wherein the cementing composition further comprises second melt-processed inorganic fibers comprising glass having a mean aspect ratio in the range of from about 1.25 to about 5,000.

17. The method of claim 11 wherein the cementing composition further comprises a non-fibrous mineral having a mean aspect ratio of at least about 50.

18. A method of cementing in a subterranean formation, comprising:
   providing a cement composition comprising water in an amount in the range of from about 30% to about 180% by weight of the cement, cement, and melt-processed inorganic fibers having a mean aspect ratio of at least about 25, wherein:
   the melt-processed inorganic fibers comprise at least one type of fiber selected from the group consisting of wollastonite fibers and ceramic fibers; and
   the melt-processed inorganic fibers have a length in the range of from 0.5 to 6 millimeters;
   introducing the cement composition into a subterranean formation; and
   allowing the cement composition to set therein.

19. The method of claim 18 wherein the melt-processed inorganic fibers further comprise basalt fibers.

20. The method of claim 18 wherein the melt-processed inorganic fibers comprise at least one of the following: melt-spun fibers or melt-blown fibers.

21. The method of claim 18 wherein the melt-processed inorganic fibers have a mean aspect ratio of at least about 100.

22. The method of claim 18 wherein the melt-processed inorganic fibers have a mean aspect ratio in the range of from about 130 to about 660.

23. The method of claim 18 wherein the cement composition further comprises non-amorphous metallic fibers having a mean aspect ratio of from about 1.25 to about 400.

24. The method of claim 18 wherein the cement composition further comprises second melt-processed inorganic fibers comprising glass fibers having a mean aspect ratio in the range of from about 1.25 to about 5,000.

25. The method of claim 18 wherein the cement composition further comprises a non-fibrous mineral having a mean aspect ratio of at least about 50.

\* \* \* \* \*